Jan. 9, 1934.  P. S. EDWARDS ET AL  1,942,594
ALTIMETER INSTALLATION
Filed Oct. 16 1929
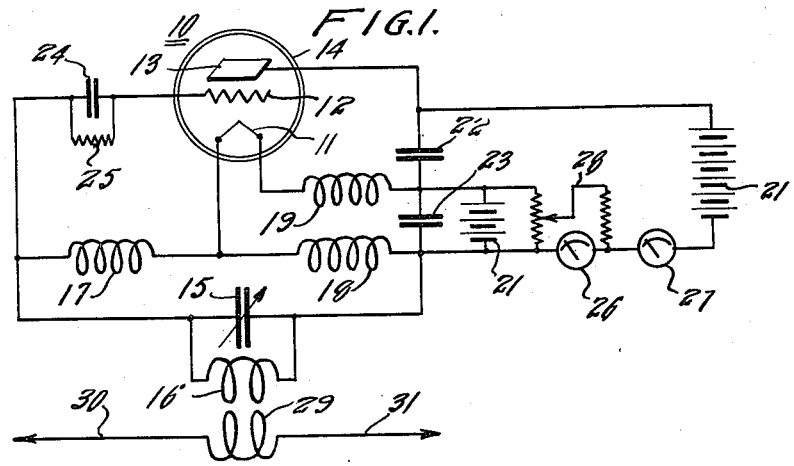
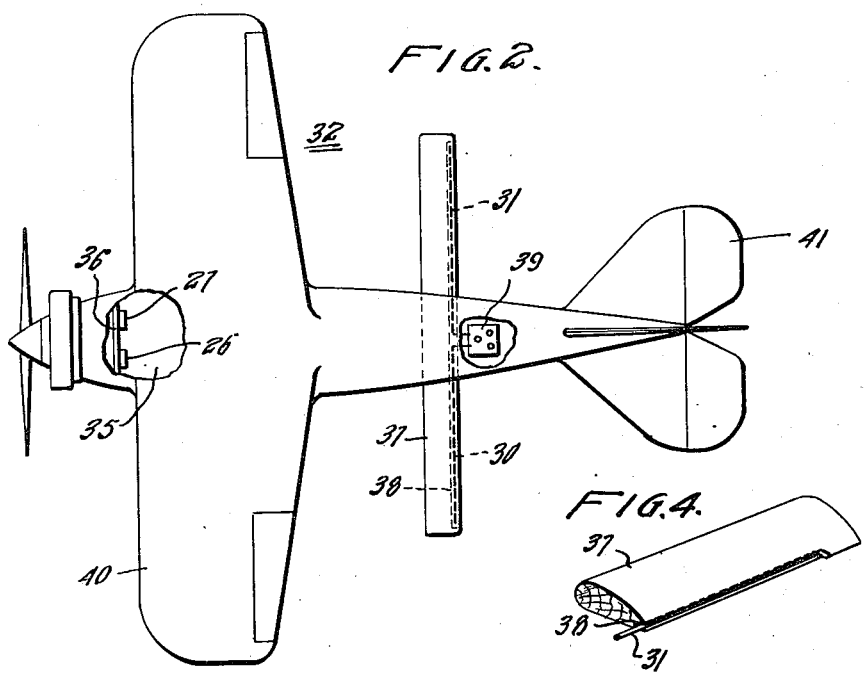
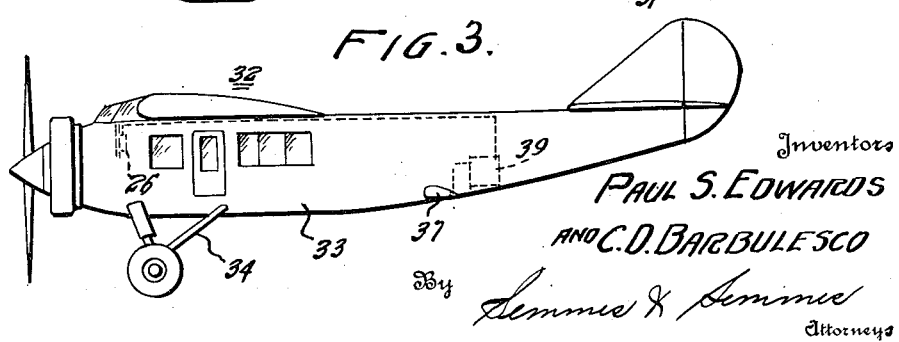
Inventors
PAUL S. EDWARDS
AND C. D. BARBULESCO
By
Lemmie & Lemmie
Attorneys Patented Jan. 9, 1934

1,942,594

UNITED STATES PATENT OFFICE 1,942,594

ALTIMETER INSTALLATION

Paul S. Edwards, Fort Meade, Md., and Constantin D. Barbulesco, Dayton, Ohio

Application October 16, 1929. Serial No. 400,042

2 Claims. (Cl. 250—33)

This invention relates to altimeters and more particularly to the installation of altimeters in aircraft.

Many solutions have been suggested pertaining to the installation of altimeters in aircraft and exhaustive experiments in actual flight have proved that the present day methods are insufficient.

Among the best known electrical means for determining with a certain degree of accuracy the true altitude of an aircraft above the earth's surface, the change in electrostatic capacitance of the metallic frame of the aircraft or metallic bodies associated therewith is the first which presents itself to the mind.

In such means for determining the altitude of an aircraft, what is really measured is the change in capacity of two metallic bodies or plates installed in spaced relation from the metallic frame of the plane, or the changes in capacity between the installed metallic bodies and the metallic frame of the aircraft, due to the proximity of the earth.

The above mentioned installations have been tested in connection with the reactance responsive relay described in application, Serial Number 305,754 filed September 13, 1928. The arrangement described in this application is to our knowledge by far the most sensitive method of determining extremely small changes in the capacitance of metallic bodies associated with an external circuit.

The practical conclusion was that the mere measurance of capacity variations may be useful for aircraft flying over water as, for example, on hydroplanes, shooting torpedoes at definitely low altitude, but for aircraft flying over unknown ground, the installation is without practical value as the aircraft may strike a tall tree, a building or a hill long before the instrument can operate.

A second electric method which gives a better solution is the radio echo or reflections by the ground of radio waves radiated by an adequate installation on the aircraft.

The principle of this method as used in connection with a reactance responsive relay is partly described in the application hereinbefore referred to. Preliminary experiments and flights show clearly the superiority of this method over any structure disclosed in the prior art.

In the first place the altitude at which the approach of the ground can be determined is easily shifted from 100 feet to 1000 feet and there is no theoretical reason why it cannot be pushed up to 5000 feet or more.

In the second place the installation is certainly simplified as the metallic bodies or plates formerly used are replaced by a straight wire of substantially the same length as the spread of the wings, or of the length of the fuselage.

Notwithstanding the simplicity and size of the radiating body, it has been found by practice that the efficiency of the altimeter is greatly enhanced by the installation and position of the antenna with respect to the metallic structure of the plane.

Heretofore, it has been suggested that the altimeter be placed in the cock pit and a doublet antenna arranged directly under the wings extending to the right and to the left. While this installation seems easy and natural, by actual practice it has been shown that it is practical only if the wings are built entirely of wood or fiber. This is seldom the case, as the tendency today is to build all-metal ships, and in some airplanes the movement of the ailerons is controlled by steel cables running parallel to the antenna and these absorb a great part of the energy radiated.

Another solution proposed is a trailing antenna. This has a great disadvantage since the relative position of the antenna with respect to the aircraft and the ground changes with the speed of the plane. Furthermore, a landing with a trailing antenna over telephone and power lines is extremely dangerous to the pilot and the aircraft.

It is a major object of the invention to prevent losses, avoid the effect of vibrations and realize a safe installation for the landing of the aircraft.

Another object of the invention is to provide a unique installation for a doublet antenna.

A further object of the invention is to provide an altimeter for aircraft which is extremely simple in structure, efficient and easily and quickly installed.

With these and other equally important objects in view, the invention comprehends the association of a doublet antenna with a self-modulated high frequency oscillator of great sensitivity and a unique and efficient means for mounting the antenna to avoid the effect of vibrations.

Other objects of the invention will appear from the following description taken in connection with the drawing, which forms part of the specification, and in which:

Figure 1 is a schematic view of a self-modulated high frequency oscillator of great sensitivity, Figure 2 is a top plan view of an aeroplane illustrating the invention as applied, Figure 3 is a side elevation of the aeroplane also illustrating the application of the invention and, Figure 4 is a perspective view of a stream line beam of wood illustrating a portion of the antenna positioned therein.

Referring to the drawing for more specific details of the invention, 10 represents generally a vacuum tube having a filament 11, a grid 12 and a plate 13 enclosed within an evacuated envelope or container 14.

Connected to the input and output circuits of the tube is a low loss tank circuit comprising a large variable capacitance 15 and a small inductance 16. The value of this capacity and inductance determine and control the frequency at which the tube oscillates.

Connected to the filament 10 are high frequency choke coils 17 and 18. These are composed of a relatively large number of turns of wire and are connected respectively in the grid and plate circuit of the tube.

When in operation, these choke coils introduce or generate two driving electromotive forces which may be considered substantially 180° out of phase. The geometric sum of these separate electromotive forces introduce and maintain a heavy oscillating current in the circuit. A third choke coil 19 is connected in the filament and serves to maintain it at high potential with respect to the ground.

The electrical supply for the tube comprises a filament battery 20 and a plate battery 21 both of which are maintained at ground potential, and bypass condensers 22 and 23 of large value permitting circulation of high frequency currents are connected in the plate circuit.

The frequency at which the tube operates is controlled mainly by the value of the condenser 15 and the inductance 16. The condenser 15 is of large value and hence the interelectrode capacity of the tube becomes substantially negligible in effect.

Connected in the grid circuit is a grid condenser 24 and a leak resistance 25. The value of the condenser and resistance is so chosen that the high frequency oscillations generated in the tank circuit will periodically charge the condenser up to a certain value and then discharge through the leak resistance to the ground. Therefore, the condenser 24 and the resistance 25 produce a periodic interruption or chopping of the high frequency oscillations.

Connected in the output circuit of the tank is a meter 26 and 27. The meter 26 is connected with a potentiometric arrangement 28 which opposes the current flowing from the filament to the plate battery, and the meter 27 may be employed to indicate the total value of the plate circuit.

Inductively coupled to the tank circuit is an exterior circuit comprising a coupling or loading coil 29 and conductors 30 and 31. This coupling may be utilized for inducing losses in the tank circuit, so as to increase the frequency of the periodic oscillations and effect a corresponding increase in the value of the plate current.

Figures 2 and 3 illustrate an aeroplane indicated generally at 32. As shown, the aeroplane comprises a fuselage 33 supported by the conventional landing gear 34. The fuselage has a cock pit 35 in which is positioned an instrument board 36 and suitably supported beneath the fuselage is a stream line beam 37, having positioned in the rear edge thereof a groove 38, the object of which will hereinafter appear.

The altimeter is enclosed in a suitable casing 39 positioned in the fuselage as far as possible from the cock pit and the doublet antenna is connected thereto. This antenna is the equivalent of the loading coil 29 and the conductors 30 and 31. As shown, the conductors are positioned in the groove 38. The altimeter is suitably grounded to the frame of the fuselage and leading from the altimeter is a conductor having connected thereto, one or more meters 26 and 27 positioned on the instrument board 36.

As shown, the conductors 30 and 31 are buried in the groove 38 in a stream line beam of wood. This beam is installed under the fuselage substantially midway of the wings 40 and the rudder 41 and the altimeter is located in the fuselage as far as possible from the cock pit, so that movement of the pilot will not disturb or affect the instrument.

It will be observed that the location of the doublet antenna is ideal, because it vibrates in half waves. This means that we have a maximum voltage and great sensitivity at both ends and zero voltage, or no sensitivity at the center. Both extremities being located as far as possible from the body of the airplane, they vibrate around a mean position without serious effect on the relative capacity with respect to the metallic frame or the moving controls of the plane.

It will be clearly understood that the danger of absorption is also entirely eliminated, so that the radiation and the reactance of the wave reflected by the ground will not be at all disturbed by the metallic structure of the plane.

As explained in the copending application hereinabove referred to, the output circuit is maintained at low potential with respect to the high frequency oscillations and the circuit is grounded. This affords the possibility for installing the indicating instruments 26 and 27 on the instrument board 36 in front of the pilot or operator regardless of the distance from the altimeter 39. Furthermore, several indicating instruments or devices can be placed in a series and the altitude read simultaneously in two or more places. This will be found of advantage where the aircraft is provided with multiple control.

The operation of the altimeter has been fully set forth in the copending application hereinabove referred to and since this application pertains entirely to the installation of the altimeter, no further explanation is deemed necessary.

While preferred embodiments of the invention have been described, it is to be understood that these are given merely as examples of the underlying principles of the invention, and since these may be incorporated in other specific mechanical structures, we do not intend to be limited to those shown except as such limitations are clearly imposed by the appended claims.

Having thus described the various features of the invention, what we claim as new and desire to secure by Letters Patent, is:—

1. In an aircraft a stream-lined strut mounted transversely to the longitudinal axis thereof across a point substantially removed from the metal parts of the aircraft having a groove in the trailing edge for rigidly supporting an antenna to minimize the capacitive effect of the metal parts of the airplane.

2. In an airplane having a fuselage cockpit, instrument board and tail assembly, a streamlined strut mounted transversely on the underside of the fuselage substantially between the cockpit and tail assembly, having a groove in the trailing edge for rigidly supporting a doublet antenna, an altimeter connected to the antenna positioned in the rear of the strut to minimize the capacitive effects of the metal parts of the airplane on the antenna and altimeter, and indicating devices on the instrument panel connected to the altimeter.

PAUL S. EDWARDS.
CONSTANTIN D. BARBULESCO.